April 30, 1963     H. GROENDIJK ET AL     3,088,047
CIRCUIT ARRANGEMENT FOR THE FORMATION OF PULSES
Filed March 3, 1959     2 Sheets-Sheet 1

INVENTOR
HENDRIK GROENDIJK
GIJSBRECHT PAUL HEIJNSDIJK
BY
AGENT

_United States Patent Office_ 3,088,047
Patented Apr. 30, 1963

3,088,047
CIRCUIT ARRANGEMENT FOR THE FORMATION OF PULSES
Hendrik Groendijk and Gijsbrecht Paul Heijnsdijk, Eindhoven, Netherlands, assignors to North American Philips Company, Inc., New York, N.Y., a corporation of Delaware
Filed Mar. 3, 1959, Ser. No. 796,807
Claims priority, application Netherlands Mar. 4, 1958
13 Claims. (Cl. 315—8.5)

The invention relates to a circuit arrangement for the formation of pulses, this arrangement comprising a discharge valve, in which a pulsatory signal is fed to a first control-electrode, whilst one coating of a capacitor to be charged is connected to a second electrode, which, viewed in the direction of the electron flow, is arranged behind the first electrode and the other coating is connected to the positive terminal of a voltage source.

Such circuit arrangements are employed inter alia in cathode-ray oscillographs, in which the voltage produced across the capacitor increases linearly with time and is fed to the deflecting plates of the cathode-ray tube arranged in the oscillograph.

The incoming control-pulses release the discharge valve, so that the capacitor can be charged linearly with time. In such an arrangement the discharge starts when the charge of the capacitor has reached a given value, since a second discharge valve connected in parallel with this capacitor is automatically released at the said instant, the latter valve producing a pulse which cuts off the first discharge valve. The next-following control-pulse starts the next-following charging period.

However, if the charge of the capacitor is to be ceased prematurely, irrespective of the value then attained, or if it is necessary to maintain the charge for a given time, whereas the pulse is yet to be produced, the aforesaid arrangement cannot be employed.

The circuit arrangement according to the invention provides a solution for this problem and is characterized in that a third electrode which is arranged either between the first and the second electrode or behind the second electrode in the valve, is connected via an impedance either to the positive terminal of the said voltage source or to the positive terminal of a separate voltage source and wherein the third electrode is connected, if desired via a network or a reversing circuit, to one of the output terminals.

The circuit arrangement according to the invention may, moreover be used to control the deflecting plates of a flat picture tube, which comprises $n+1$ deflecting plates and in which the electron beam is deflected in one direction by means of the potentials applied to these deflecting plates, whilst the flat picture tube comprises furthermore deflecting means which deflect the electron beam in a direction at right angles to the aforesaid direction, the said $n+1$ deflecting plates being arranged parallel to a plate which operates at the same time as a display screen.

The arrangement for controlling the deflecting plates which comprises $n$ circuit arrangements in accordance with the invention is characterized in that the plate operating as a display screen is connected to the positive terminal and one of the deflecting plates preferably to the negative terminal of a voltage source, whilst the said $n$ circuit arrangements are connected each on the one hand to one of the further $n$ deflecting plates and on the other hand to the negative terminal of the said voltage source and are controlled by means of pulses supplied via pulse-deforming intermediate switching devices added to each of the circuits arrangements, so that successively each of the circuit arrangements is switched on and the associated deflecting plate decreases its potential linearly in time with respect to the display screen, i.e. for a time which is slightly shorter than $1/n$ times the time of one period of the deflection produced by the said deflecting plates, whilst after the deflecting plate concerned has dropped to a given potential, the circuit arrangement concerned gives off a pulse to an intermediate switching device, which deforms this pulse and transfers it as a control-pulse to a subsequent circuit arrangement after which previously operative circuit arrangement is switched off by the control-pulse supplied.

A possible embodiment of a circuit arrangement according to the invention will now be described with reference to the figures.

Figure 1:
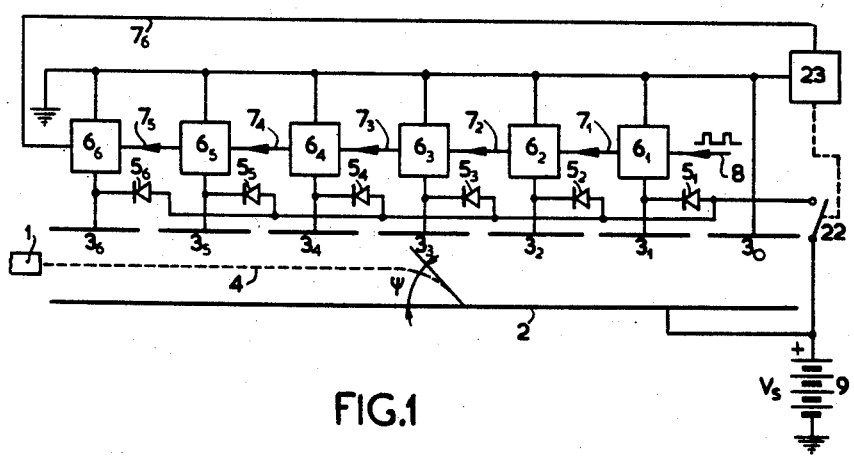
FIG. 1 shows an arrangement in which a plurality of circuit arrangements according to the invention are used to control the electron beam in a flat picture tube.

FIG. 1 shows the flat picture tube diagrammatically. The screen 2, which operates as a display screen, and which is therefore coated with a suitable phosphor, is provided with a thin, transparent electrode. This screen 2 will be termed hereinafter plate 2, to which the required operational voltage can be applied.

The figure shows furthermore the electron gun 1, which produces an electron beam 4, and the seven deflecting plates, which extend parallel to plate 2, are designated by $3_0$ to $3_6$. The assembly is mounted in a bulb of suitable material. The electron beam 4 is deflected in a direction at right angles to the plane of the drawing by separate deflecting means (not shown) and it is supposed herein that, if the arrangement of the flat tube is such that its upper side is shown on the right-hand side of the figure and its lower side on the left-hand part thereof, the said direction constitutes the horizontal deflection, whereas the deflecting plates $3_0$ to $3_6$ provide the deflection of the electron beam in the plane of the drawing, i.e. the vertical direction. It will be evident, however, that the functions of the said deflecting means may be interchanged.

In the rest position, i.e. at the beginning of the deflection of the beam 4 in the vertical direction, the plates 2 and $3_1$ to $3_6$ are at the same potential, whereas the plate $3_0$ is at earth potential, so that the beam 4 will strike the plate 2 only at the surface below the plate $3_0$ or slightly beyond this area. This plate $3_0$, however, may also be connected to the cathode of the gun 1, since also the potential of the cathode will be low with respect to that of the plate 2. When the potential of the plate $3_1$ is lowered with respect to that of the plate 2, the beam will be exposed at this area to a repelling force, which causes the impact area on the plate 2 to shift in the direction towards the gun 1. This repelling force will be the stronger, the more the potential of the plate $3_1$ is reduced, so that the impact area of the beam 4 on the plate 2 is shifted from right to left. If care is taken that the plate $3_2$ takes over the function of the plate $3_1$ at the correct instant, which means that from this instant the potential of the plate $3_2$ is reduced linearly with respect to that of the plate 2, the impact area will be shifted farther over the plate 2 in the domain covered by this deflecting plate. If at the correct instants the plates $3_3$ to $3_6$ take over the functions, the beam 4 is deflected over the whole display screen, so that a complete scan is accomplished. At the end of each scanning period care must be taken that the plates $3_1$ to $3_6$ resume the same potential as the plate 2, so that the scan is permitted to restart.

On the ground of the foregoing suppositions this means that in one scanning period one raster of the television image is written, but if the beam were deflected in the horizontal direction with the aid of the deflecting plates, one line would be scanned in one scanning period and with the aid of the deflecting means (not shown) the beam 4 must be displaced slightly in the other direction, so that during the next-following period the subsequent line is scanned.

In the embodiment shown an arrangement with seven deflecting plates is described; this means that the domain covered by one deflecting plate is larger than in the case of more deflecting plates. In the case of a smaller covered range the angle (i.e. the acute angle between the incident beam 4 and the plate 2) is, on an average, larger than in the case of a larger covered range. Therefore, in the first case the surface struck by the beam 4 (which is focused by means not shown in the figure and which will therefore have a given diameter) is, on an average, smaller than in the case of a larger area covered by one deflecting plate.

The resolution characteristic is therefore improved according as a larger number of deflecting plates is used. The control of the deflecting plates, however, becomes more costly, since the switching apapratus must be extended, so that with a satisfactory focusing of the beam 4 a comparatively small number of deflecting plates may suffice.

The deflecting plates $3_1$ and $3_6$ are controlled with the aid of the switching devices $6_1$ to $6_6$ and the unilaterally conductive elements $5_1$ to $5_6$, which are connected on the one hand to the plates $3_1$ and $3_6$ and on the other hand to each other and to the switch 22, which is controlled by means of the device 23. In the rest position the switching devices $6_1$ and $6_6$ are all cut off, so that all plates are at the potential $V_s$, determined by the voltage source.

This potential $V_s$ may be, for example, 15 kv. in order to ensure a satisfactory luminous output.

By means of synchronizing pulses, which may be derived from an incoming television signal, and which are supplied through the conductor 8 to a switching device $6_1$, the latter is released and will convey a substantially constant current, which charges linearly with time the capacitor formed by the plate 2 (which is held at a constant potential $V_s$) and the plate $3_1$, so that the potential of plate $3_1$ decreases linearly with time with respect to the potential of plate 2. When the potential at plate $3_1$ has dropped to a given value, the device $6_1$ transfers, via the conductor $7_1$, a pulse to the switching device $6_2$, which is, in turn, released and will convey a substantially constant current. Thus the capacitor formed by the plate 2 and the plate $3_2$ is charged and the plate $3_2$ takes over the deflecting function of plate $3_1$. The switching device $6_1$ is automatically cut off, after the plate $3_2$ has taken over the function, and the capacitor 2, $3_1$ maintains its charge obtained until in a manner to be described hereinafter the device 23 closes the switch 22 at the end of a scanning period for a short instant. Thus the plate $3_1$ maintains a low potential with respect to plate 2, so that $3_1$, after having accomplished its function, cannot affect adversely the deflection of the beam 4.

In turn, the switching device $6_2$ transfers, via the conductor $7_2$, a pulse to a switching device $6_3$ at the instant when the plate $3_2$ reaches a given potential, so that the switching device $6_3$ is released and the device $6_2$ is cut off automatically after some time.

This process is repeated with the switching device $6_3$ to $6_6$, so that the beam 4 is deflected continuously and the impact area is displaced from right to left throughout the plate.

Figure 2:
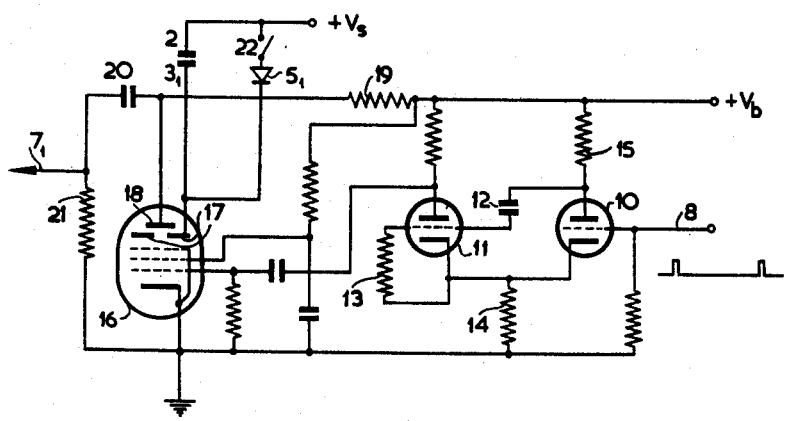
FIG. 2 shows a further detailed diagram of a circuit arrangement device used in the arrangement shown in FIG. 1 and FIGS. 3 and 4 serve for explanation.

FIG. 2 shows a detailed circuit diagram of the device $6_1$ with the associated element $5_1$ and the switch 22. The further devices $6_2$ to $6_6$ are quite identical, but the conductor 8 is to be considered replaced by one of the conductors $7_1$ to $7_5$ and the capacitor plate $3_1$ by one of the plates $3_2$ to $3_6$. It should be noted that the valve 16 with the associated switching elements constitutes the switching device proper according to the invention, whilst a monostable multivibrator, constituted by the valves 10 and 11, operates as an intermediate switching device. This monostable multivibrator circuit deforms the synchronizing pulses supplied to the conductor 8 to obtain the waveform suitable for the said purpose, after which the deformed pulses are fed, as control-pulses, to the valve 16. Equally the pulses obtained from the conductor $7_1$ are deformed by the intermediate switching device associated with the switching device $6_2$. It will be obvious that these intermediate switching devices may be constituted, as an alternative, by different pulse generators, for example unstable multivibrators or transitron circuits.

As shown in FIG. 2, the synchronizing pulses are fed via the conductor 8 to the monostable multivibrator circuit consisting of a triode 10, which is cut off in the stable state, and the triode 11, which is released in the stable state. The positive-going synchronizing pulses at the grid of the valve 10 release this valve and cut off the valve 11. This state is maintained until the capacitor 12 is discharged, after which the multivibrator returns into the stable state. The next-following synchronizing pulse brings the multivibrator again into the unstable state.

The output voltage of valve 11 has the waveform shown in FIG. 3a. At the instant $t=t_1$ valve 10 is released and valve 11 cut off and this state is maintained for a time $T_1$, after which the stable state is regained and maintained for a time $T_2$, after which the next-following period is started by the subsequent synchronizing pulse. If the deflecting plates $3_1$ to $3_6$ provide the deflection in the vertical direction, $T_1+T_2$ must be $\frac{1}{50}$ sec., i.e. the time of one raster. In the example shown $T_1$ must be, at a minimum, $\frac{1}{6} \cdot \frac{1}{50} = \frac{1}{300}$ sec., since this is approximately the time for which the plate $3_1$ must deflect the electron beam.

This means that the pentode 16, which is controlled by the voltage shown in FIG. 3a, is each time cut off for a period $T_2$ and released for a period $T_1$. Since the internal resistance of this valve is very high and if provisions are taken that the voltage at the anode 17 drops to a value such that the anode-current—anode-voltage limit characteristic curve is traversed only for a short time, it may be supposed that for part of the time $T_1$ the current to the anode 17 is substantially constant so that the capacitor 2, $3_1$ is charged substantially linearly with time.

At the end of each scanning period, i.e. a short time before the switching device $6_1$ is again cut off, the switch 22 is closed and the capacitor 2, $3_1$ can discharge rapidly via the element $5_1$ and the switch 22. The plate $3_1$ thus rapidly increases its potential to the value $V_s$ and since the switching device $6_1$ is again released by the subsequent synchronizing pulse, the capacitor 2, $3_1$ is recharged linearly with time. The variation of the voltage at the anode 17 as a function of time is shown in FIG. 3d.

The anode 17, which is shown split up in FIG. 2, consists of a plate which is provided at its centre with an opening. Behind this plate 17 is arranged an auxiliary anode 18, which is connected via a resistor 19 to a much lower supply voltage $V_b$.

This auxiliary anode may, for example, be the screening cage which usually surrounds the electrode system.

Figure 3:
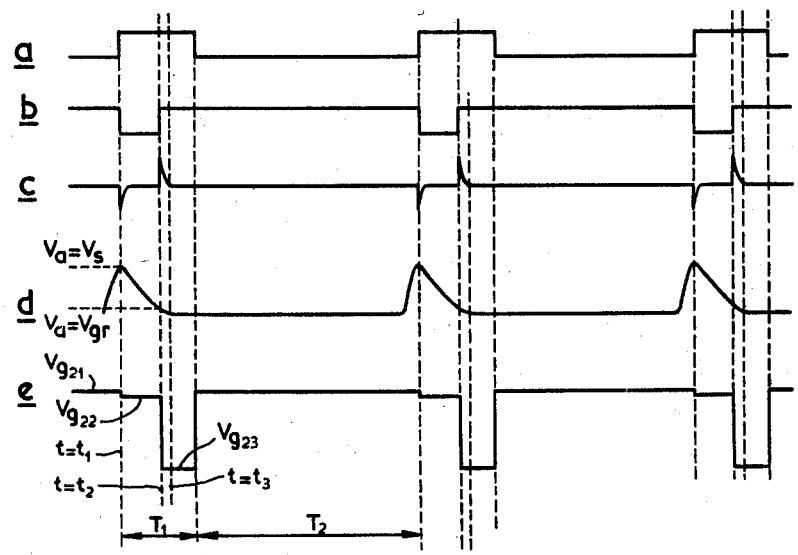

As long as the voltage at the anode 17 has not dropped to a value such that the anode-current—anode-voltage limit characteristic curve is reached $V_a = V_{gr}$, a sufficient quantity of electrons will pass through the opening in the anode 17 and be capable of reaching the anode 18, so that also across the resistor 19 a certain voltage drop occurs at the instant when the valve 16 is released. If the voltage at the anode 17 drops to the valve $V_{gr}$ (see FIG. 3d), the said limit characteristic curve will be followed and the screen-grid current will increase at the expense of the anode current, as a result of which the electrons can no longer attain the auxiliary anode 18, arranged behind the anode 17. The current through the resistor 19 decreases and the voltage at the anode 18 increases. The instant when the value $V_{gr}$ is reached as indicated in FIG. 3 by $t=t_2$. The voltage produced across the resistor 19 has the waveform shown in FIG. 3b. It can be differentiated with the aid of the network consisting of the capacitor 20 and the resistor 21, so that the voltage pulse fed to the multivibrator circuit of the device $6_2$ via conductor $7_1$ has the waveform shown in FIG. 3c. The negative-going pulse is not employed, since the triode 10 is already cut off; the positive-going pulse produces a change-over of the multivibrator, which produces an output voltage as shown in FIG. 3a, which voltage starts, however, at the instant $t_2$ instead of instant $t_1$. This pulsatory voltage controls, in turn, the valve 16 of the device $6_2$, so that the potential of the plate $3_2$ is reduced and the whole aforesaid process is repeated. Plate $3_2$ takes over the function at the instant $t_2$, so that $r_2-t_1$ must be slightly shorter than 1/300 sec. The time $t_2-t_1$ must be chosen to be such that $6.(t_2-t_1)$ is shorter than 1/50 sec., so that the beam 4 (after the complete deflection in vertical direction has been accomplished) is allowed to leap back to the beginning of the display screen during the fly-back period.

In FIG. 3a $T_1$ is longer than 1/300 sec. Thus the valve remains cut off for a longer time than strictly necessary and the charge of the capacitor is continued even after the instant $t=t_2$, though no longer linearly with time, until at the instant $t=t_3$ the anode voltage 17 has dropped to a value such that substantially no electrons attain this plate. The instant $t=t_2$ is therefore determined by the value of the anode current and the value of the capacitor 2, $3_1$.

In order of succession the switching devices $6_3$ to $6_6$ are made operative. The last device $6_6$ transmits via the conductor $7_6$ a control-pulse, which produces a suitable voltage for the device 23 to control the switch 22.

The switch 22 may be, for example, a discharge valve, the anode of which is connected to the positive terminal of the voltage source 9 and the cathode of which is connected to the various interconnections of the elements $5_1$ to $5_6$, a positive-going sawtooth control-voltage being fed to the control-grid thereof. Only during the occurrence of this control-voltage the discharge valve is released and the capacitors 2, $3_1$ to 2, $3_6$ can be discharged via the elements $5_1$ to $5_6$ and the said discharge valve.

Then the whole scanning process restarts, since the device $6_1$ is released by the subsequent synchronizing pulse.

If not a monostable, but an instable multivibrator is used or a transitron circuit as an intermediate switching device, it will be obvious that the duration of the positive-going output pulse supplied by the latter must exceed $t_2-t_1$, whereas the total period must exceed one frame scanning period. The synchronizing pulses and the pulses produced by the valves 16 serve in this case to synchronize the pulse generators.

If an arrangement is desired in which no synchronizing signals control the device $6_1$, the pulse produced by the pentode of the device $6_6$ can be fed not only to the device 23, but also, by means of a delay network, as a control-pulse to the device $6_1$. Such a self-supporting deflecting arrangement may be required to prevent damage to the display screen, since, when no signal is received, the deflection has to operate, since otherwise, when only the deflecting means for the other direction are operative, a luminous line is produced on the display screen, so that burning-in of this screen may be caused.

At the reception of a signal, the synchronizing pulses derived therefrom may be fed in a suitable manner to the multivibrator circuit of the device $6_1$, with which the self-supporting deflecting circuit can be synchronized.

A similar effect may be attained by replacing the pentode 16 by a tetrode without a second anode. This tetrode is controlled in the same manner as the pentode, so that the screen-grid current increases when the decreasing anode voltage approaches the screen-grid voltage, at the expense of the anode current, since secondary electrons travel from the anode to the screen-grid, so that the voltage at the not or substantially not decoupled screen-grid will drop. When the tetrode is cut off by the voltage from the multivibrator, the screen-grid voltage increases, so that a negative-going pulse is produced across the screen-grid resistor.

By suitable proportioning of the tetrode, the current to the screen-grid may be kept low with respect to the state, in which substantially the whole current flows to the screen-grid, in the event of a full anode current. Thus (see FIG. 3e) the potential ($V_{g22}$) at the screen-grid will differ, when the tetrode is released and the capacitor is not yet charged, from the potential ($V_{g21}$) at the screen-grid, when the tetrode is completely cut off, to a smaller extent than from the potential ($V_{g23}$) at which the capacitor is charged.

FIG. 3e shows the voltage produced at the screen-grid. It is evident therefrom that from the instant $t=t_2$ to the instant $t=t_1+T_1$ the said negative-going pulse occurs, which can be fed via the conductor $7_1$ either to the control-grid of the valve 11 or via a reversing device, to the control-grid of the valve 10 of the switching device $6_2$.

It should be noted that the arrangement is described for use with television; however, it need not be restricted in any way to this domain; it may be employed anywhere, when an electrical signal is to be converted into an image. Only the discharge and switching times, as well as the supplied and obtained synchronizing signals, should be adapted to the use concerned.

If a tetrode valve is used, the arrangement according to the invention may also be used as a counting device. To this end the multivibrator is proportioned so that the tetrode valve is released for a shorter time than would be required to continue the charging of the capacitor 2, $3_1$ to an extent such that the voltage at the anode will follow the limit characteristic curve.

Figure 4:
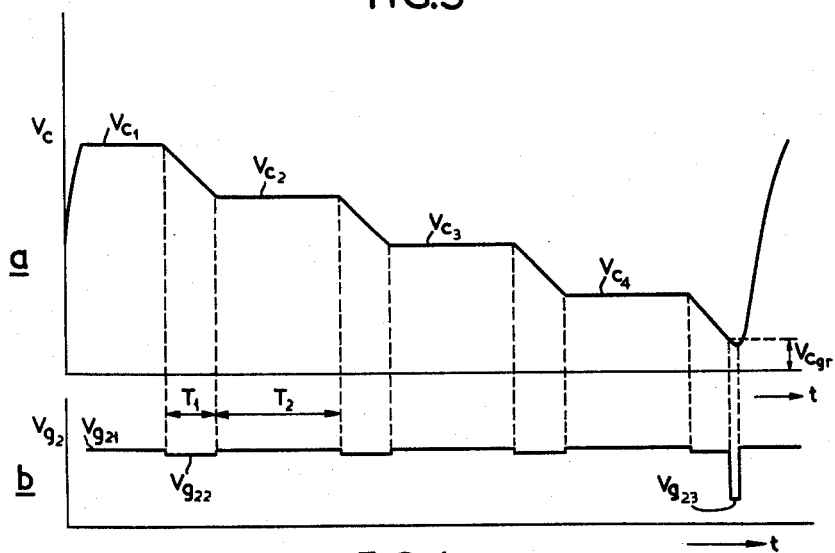

If in FIG. 4a, which illustrates the voltage at the anode as a function of time for one charging period, $V_{cgr}$ designates the voltage at which the anode voltage has dropped to an extent such that the limit characteristic curve is followed, it is evident from this figure that the capacitor 2, $3_1$ of this embodiment is charged in four steps.

In FIG. 4a $V_{c1}$ designates the level which the anode voltage reaches when the capacitor 2, $3_1$ is completely discharged. The first incoming pulse moves the multivibrator circuit into the unstable state, as a result of which the tetrode is released for a time $T_1$ and the capacitor is charged, the anode voltage attaining the value $V_{c2}$. Then the multivibrator returns into the stable state, so that the valve is cut off and the anode voltage is maintained at the level $V_{c2}$ for a time $T_2$.

The subsequent pulse provides indirectly a renewed release of the valve, the anode voltage dropping during this second stage to the level $V_{c3}$.

In this way four incoming pulses are required before the anode voltage attains the value $V_{cgr}$ and not until is given off a pulse via the conductor $7_1$, which pulse may be directly used as an information or may be fed to a subsequent, identical circuit. The produced pulse is, moreover, used to close the switch 22, so that the capacitor 2, $3_1$ is rapidly discharged. The element $5_1$ may be dispensed with, since the elements $5_1$ to $5_6$, in the case of the control of a flat display tube, are only required to prevent relative short-circuits of the plates $3_1$ to $3_6$.

FIG. 4b illustrates the voltage at the screen-grid as a function of time. From this figure it is evident that each time during a period $T_1$ negative-going pulses with an amplitude $V_{g21}-V_{g22}$ occur and that at the end of the fourth step a short-duration negative-going pulse occurs with a larger amplitude, of which the portion $V_{g22}-V_{g23}$ may be utilized. The latter pulse, if desired after limitation, is obtained from the conductor $7_1$. In the present embodiment therefore four pulses are counted, but it will be obvious that, by choosing a higher value for the level $V_{c1}$ and a lower value for the time $T_1$, this number may be extended and conversely, be reduced by opposite measures.

It is thus possible to compose a counting or dividing arrangement, which is capable of dividing in a reliable manner. Such counting arrangements may be used, for example, in television transmitters to produce the various synchronizing signals.

It is furthermore possible to use the arrangement according to the invention to control the deflecting plates of a cathode-ray tube in a cathode-ray oscillograph. The plates 2 and $3_1$ of FIG. 2 may, in this case, be connected to the deflecting plates concerned of the cathode-ray tube by means of one or more capacitors. In this case, the switching pulses obtained from the conductor $7_1$ are directly used to close the switch 22. Also in this case the element $5_1$ can be dispensed with.

The pulses derived from the conductor $7_1$, in accordance with their polarity, may be fed via a delay network to the control-grid of the triode 11 or the triode 10, so that a self-supporting arrangement is obtained, whilst, if desired in the manner described above, synchronizing pulses can be supplied.

Since a cathode-ray oscillograph requires different scanning periods, the capacitors 12 and 2, $3_1$ may be variable, so that the cut-off time of the valve 11 is adapted to the necessarily varied charging time of the capacitor 2, $3_1$.

If the electron beam in the cathode-ray tube is to be controlled so that the beam is deflected continuously in one direction and only for a time $T_1$ in the other direction, then not deflected for a time $T_2$, then again deflected for a time $T_1$, and so on, use may be made successfully of a control-voltage as illustrated in FIG. 4a.

It will be obvious that numerous further combinations are possible. The multivibrator circuit, for example, may be omitted and the pulsatory voltage shown in FIG. 3a may be directly fed to the control-grid of the pentode 16, after which an output voltage as illustrated in FIG. 3b is obtained. Any reduction of the pulse duration may be adjusted, since the time $t_2 - t_1$ (duration of the output pulse) depends only upon the charging time of the capacitor and is independent of the releasing time of the valve 16. If use is made of a tetrode, an output voltage as illustrated in FIG. 3e or one as shown in FIG. 4b may be obtained, if the duration of the pulses fed to the control-grid of the tetrode is shorter than the charging time of the capacitor included in the anode circuit.

As a further alternative, the pulsatory voltage supplied may have a fairly arbitrary waveform, if only provisions are taken that the positive-going components of the signal render the valve abruptly conductive.

It is also possible to utilize a multigrid valve, for example, a hexode as a current source to charge the capacitor, of which one coating is connected to the screen-grid and the other coating to the positive terminal of the voltage source, to which also the anode is connected. Such an arrangement will have substantially the same properties as the arrangement comprising the pentode 16 shown in FIG. 2.

What is claimed is:

1. A circuit for the formation of pulses comprising a discharge tube having, a cathode, a control electrode, an anode, and an output electrode, said output electrode having a current characteristic dependent upon the potential of said anode, a source of pulsatory signals, means applying said signals to said control electrode, a source of potential, a capacitor, means connecting said capacitor between said anode and the positive terminal of said source of potential, means connecting the negative terminal of said source of potential to said cathode, and differentiating output circuit means connected to said output electrode, whereby a sawtooth-shaped waveform is produced at said anode and a pulse is produced in said output circuit means at a predetermined time with respect to said sawtooth-shaped waveform.

2. A circuit for the formation of pulses comprising a discharge tube having a cathode, a control grid, and first and second anodes, said first anode having an aperture behind which said second anode is positioned, a source of pulsatory signals, means applying said signals to said control grid, a source of potential, a capacitor, means connecting said capacitor between said first anode and the positive terminal of said source of potential, means connecting the negative terminal of said source of potential to said cathode, and differentiating output circuit means connected to said second anode, whereby a sawtooth-shaped waveform is produced at said first anode and a pulse is produced in said output circuit means at a predetermined time with respect to said sawtooth-shaped waveform.

3. A circuit for the formation of pulses comprising a discharge tube having a cathode, a control grid, and first and second anodes, said first anode having an aperture behind which said second anode is positioned, a source of pulsatory signals, means applying said signals to said control grid, a first potential source, a capacitor, means connecting said capacitor between said first anode and the positive terminal of said first source, a second potential source, resistance means connected between the positive terminal of said second source and said second anode, differentiating output circuit means connected to said second anode, and means connecting the negative terminals of said first and second sources to said cathode, said first source having a potential substantially higher than said second source, whereby a sawtooth-shaped waveform is produced at said first anode and a pulse is produced in said output circuit means at a predetermined time with respect to said sawtooth-shaped waveform.

4. A circuit for the formation of pulses comprising a discharge tube having a cathode, a control grid, a screen grid and an anode, in that order, a source of pulsatory signals, means applying said signals to said control grid, a source of potential, a capacitor, means connecting said capacitor between said anode and the positive terminal of said source, means connecting the negative terminal of said source to said cathode, and differentiating output circuit means connected to said screen grid, whereby a sawtooth-shaped waveform is produced at said anode and a pulse is produced in said output circuit means at a predetermined time with respect to said sawtooth-shaped waveform.

5. A circuit for the formation of pulses comprising a discharge tube having a cathode, a control grid, a screen grid and an anode, in that order, a source of pulsatory signals, means applying said signals to said control grid, a first potential source, a capacitor, means connecting said capacitor between said anode and the positive terminal of said first source, a second potential source, resistance means connecting the positive terminal of said second source to said screen grid, means connecting the negative terminals of said first and second sources to said cathode, said first source having a potential substantially greater than said second source, and substantially non-decoupling output circuit means connected to said screen grid.

6. A circuit for the formation of pulses comprising a discharge tube having a cathode, a control electrode, an anode, and an output electrode, said output electrode having a current characteristic dependent upon the potential of said anode, a source of pulsatory signals, means applying said signals to said control electrode, a source of potential, a capacitor, means connecting said capacitor between said anode and the positive terminal of said potential source, means connecting the negative terminal of said potential source to said cathode, switch means connected in parallel with said capacitor, output circuit means connected to said output electrode, and means operatively connecting said output circuit means to said switch means.

7. The circuit of claim 6, in which said switch means comprises a discharge tube having a cathode, a control electrode, and an anode, the cathode-anode circuit of said last-mentioned tube being connected in parallel with said capacitor, and said output circuit means is connected to the control electrode of said last-mentioned tube.

8. A circuit for the formation of pulses comprising a discharge tube having a cathode, a control electrode, an anode, and an output electrode, said output electrode having a current characteristic dependent upon the potential of said anode, monostable multivibrator means having an input circuit and an output circuit, means connecting said output circuit to said control electrode, a source of potential, a capacitor, means connecting said capacitor between said anode and the positive terminal of said source of potential, means connecting the negative terminal of said source to said cathode, and differentiating output circuit means connected to said output electrode, whereby a sawtooth-shaped waveform is produced at said anode and a pulse is produced in said output circuit means at a predetermined time with respect to said sawtooth-shaped waveform.

9. The circuit of claim 8, in which said output circuit means is connected to the input circuit of said multivibrator means.

10. A deflection system for a flat cathode ray tube of the type having $n+L$ coplanar deflecting plates, a plate parallel to and spaced from the plane of said deflecting plates, means for producing an electron beam between said deflecting plates and parallel plate, and means for deflecting the beam in a direction parallel to the parallel plate, said system comprising $n$ pulse formation circuits, each of said pulse formation circuits comprising a discharge tube having a cathode, a control electrode, an anode and an output electrode, the output electrodes having current characteristics dependent upon the potential of the respective anodes, means connecting said anodes to separate deflecting plates, a source of potential, means connecting said cathodes and the remaining deflecting plate to the negative terminal of said source, means connecting said parallel plate to the positive terminal of said potential source, separate pulse deforming circuit means connected to each of said control electrodes, output circuit means connected to said output electrodes, and means successively connecting said pulse formation circuits comprising means connected to the output circuit means of one pulse formation circuit to the pulse deformation circuit means of another pulse formation circuit.

11. The system of claim 10, in which said pulse deforming circuit means are monostable multivibrators.

12. The system of claim 10, comprising separate unilaterally conductive elements and switch means serially connected between each of said separate deflecting means and said parallel plate, and means operatively connecting said pulse formation circuits to said switch means.

13. The system of claim 10, comprising delay network means, and means connecting the output circuit means of the last of said pulse formation circuits to the pulse deformation circuit means of the first of said pulse formation circuits.

References Cited in the file of this patent
UNITED STATES PATENTS

| | | |
|---|---|---|
| 2,159,818 | Plaistowe | May 23, 1939 |
| 2,205,069 | Rust | June 18, 1940 |
| 2,473,691 | Meacham | June 21, 1949 |
| 2,476,978 | Hilton | July 26, 1949 |
| 2,563,807 | Alfven | Aug. 14, 1951 |
| 2,620,454 | Skellet | Dec. 2, 1952 |
| 2,677,783 | Wilson | May 4, 1954 |
| 2,795,729 | Gabor | June 11, 1957 |
| 2,795,731 | Aiken | June 11, 1957 |
| 2,871,403 | Buckbee | Jan. 27, 1959 |
| 2,880,365 | Law et al. | Mar. 31, 1959 |